G. E. FORTESCUE.
METALLIC TIRE.
APPLICATION FILED DEC. 22, 1908.

924,156.

Patented June 8, 1909.
4 SHEETS—SHEET 1.

Witnesses
Jesse N. Lutton
R. V. Sommers

Inventor
George E Fortescue
per Henry Orth Jr.
Attorney

G. E. FORTESCUE.
METALLIC TIRE.
APPLICATION FILED DEC. 22, 1908.

924,156.

Patented June 8, 1909.
4 SHEETS—SHEET 2.

Witnesses

Inventor
George E Fortescue
per
Attorney

G. E. FORTESCUE.
METALLIC TIRE.
APPLICATION FILED DEC. 22, 1908.

924,156.

Patented June 8, 1909.
4 SHEETS—SHEET 3.

Witnesses
Jesse N. Lutton

Inventor
George E Fortescue
per
Attorney

G. E. FORTESCUE.
METALLIC TIRE.
APPLICATION FILED DEC. 22, 1908.

924,156.

Patented June 8, 1909.
4 SHEETS—SHEET 4.

Witnesses
Jesse K. Lutton

Inventor
George E Fortescue
per
Attorney

UNITED STATES PATENT OFFICE.

GEORGE EDWARD FORTESCUE, OF ARNCLIFFE, NEW SOUTH WALES, AUSTRALIA.

METALLIC TIRE.

No. 924,156.  Specification of Letters Patent.  Patented June 8, 1909.

Application filed December 22, 1908. Serial No. 468,785.

*To all whom it may concern:*

Be it known that I, GEORGE EDWARD FORTESCUE, a subject of the King of Great Britain, residing at "T'Gatta" Hirst street, Arncliffe, near Sydney, in the State of New South Wales and Commonwealth of Australia, manufacturer, have invented a new and useful Improvement in Metallic Tires, of which the following is a specification.

This invention relates to metal tires of wheels for road vehicles which are not bolted or riveted to the rim or felly and has for its object to provide an improved connector for the meeting ends thereof the use of which will dispense with the necessity of shrinking the tire on the wheel and will allow of periodical and necessary tightening or loosening of said tire and further will allow if desired said tire having slight flanges over the rim or felly or being internally concave to hold the latter from side play.

Improved ends-closure for metal tires of wheels constructed according to this invention has a scarfing piece to which the respective ends of the tire are hooked and cottered or keyed by means of slots in the tire ends studs on the scarf piece and cotter-heads on pins preferably fastening the whole to or through the felly one or both of said cotter-heads drawing both of the tire ends into locked position both circularly and in relation to its flat or other surface on the felly. But in order to explain how best this invention may be carried out in practice it will now be described with reference to the drawings accompanying and forming part of this complete specification.

Figure 1:
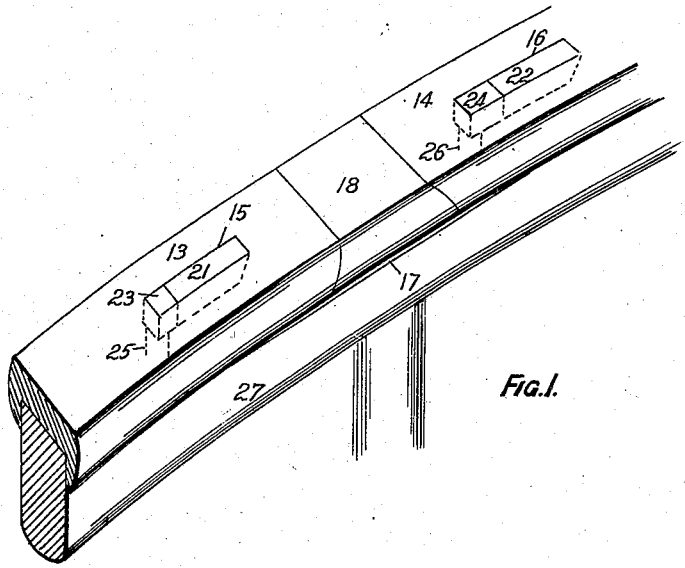
Figure 2:
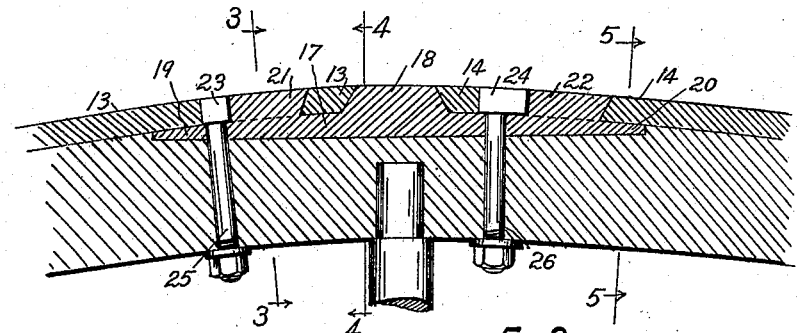
Figure 3:
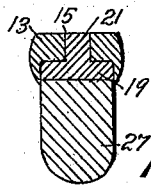
Figure 4:
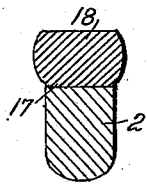
Figure 5:
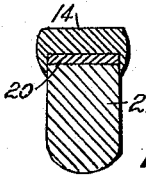
Figure 6:
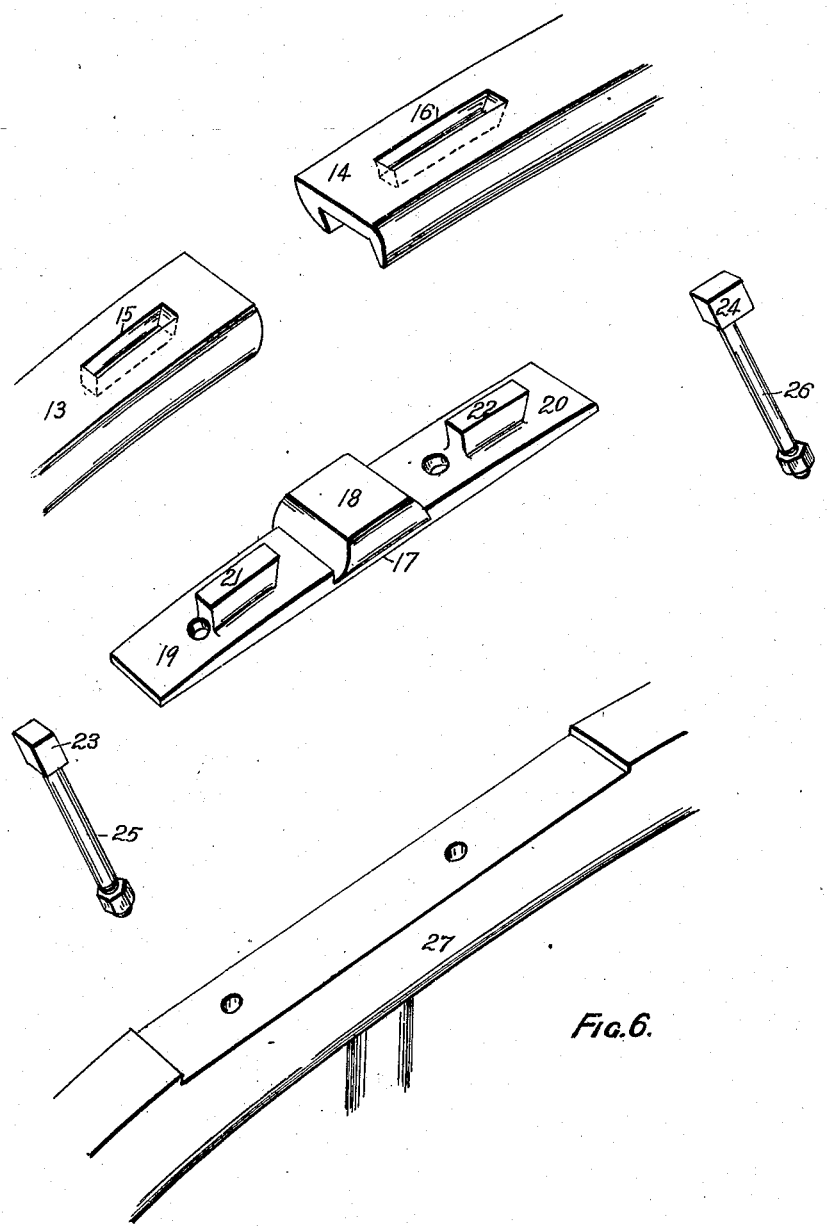
Figure 7:
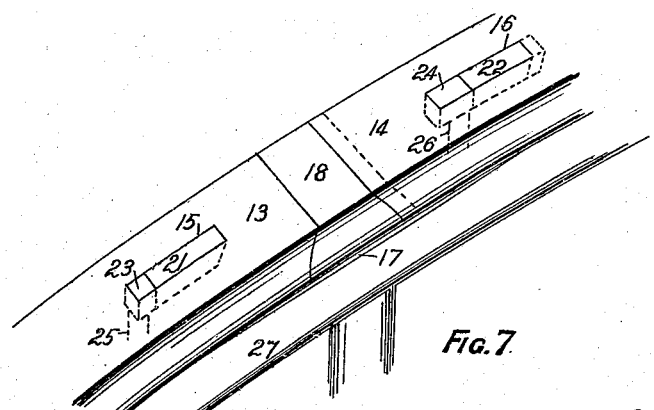
Figure 9:
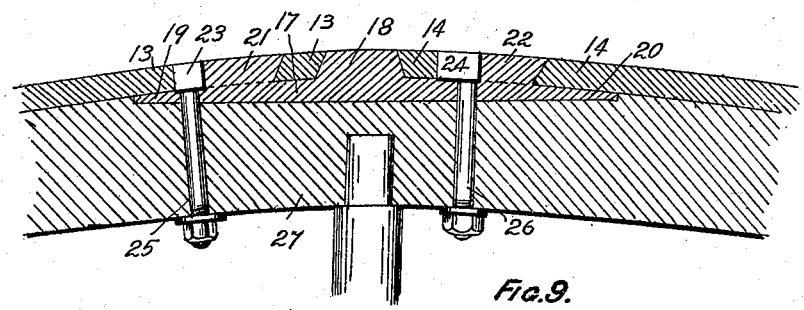
Figure 10:
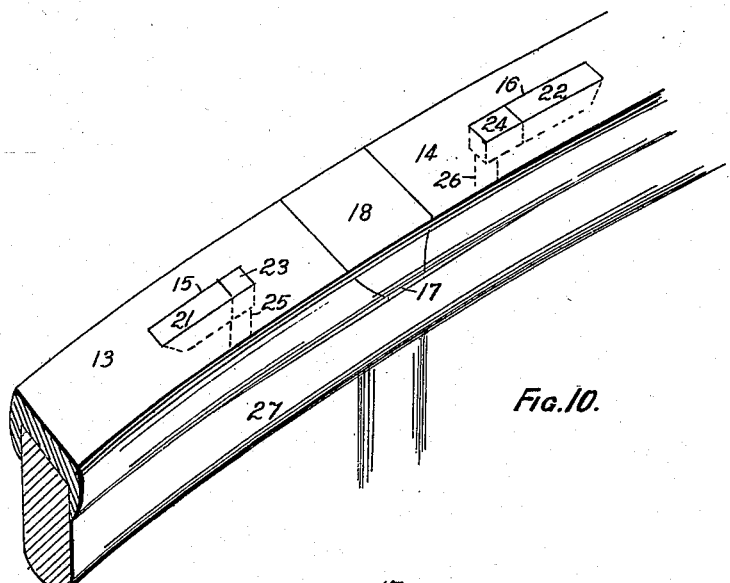
Figure 11:
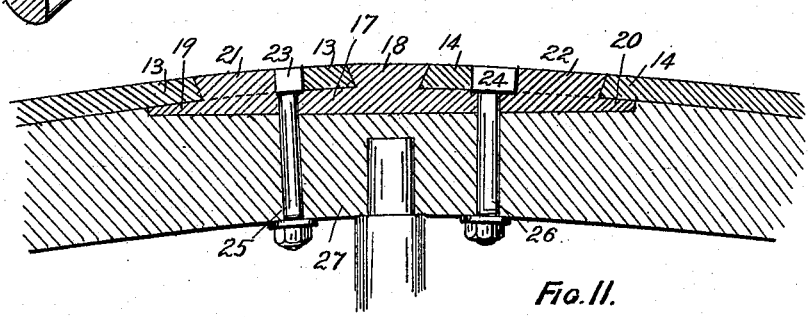

Figure 1 is a partial perspective view of a metal tire connected up on a wheel felly by an improved ends-closure according to this invention. Fig. 2 is a longitudinal sectional elevation of the same and Figs. 3, 4 and 5 cross sections on the respective lines 3 4 and 5 in Fig. 2 and Fig. 6 is a perspective view of the same showing the various parts disconnected. Fig. 7 is a partial perspective view of the same tire after being shortened Fig. 8 being a perspective view of the substitute scarf piece with its cotter-headed pin used therein and Fig. 9 a longitudinal sectional elevation of the whole. Figs. 10 and 11 are similar views to Figs. 1 and 2 showing a modified construction of the ends-closure and Fig. 12 a perspective view of the scarf piece and cotter headed pins used therein.

The tire end 13 has a slot 15 near its end while the other tire end 14 has a somewhat similar slot 16 near its end. Under these two ends is a filling or scarf piece 17 having a central filling piece 18 adapted to surface with the outer face of the tire and having its ends at the same incline as the ends of the tire as hereinafter explained. From this central filling piece 18 the scarf piece tapers both ways to the curvature of the tire and surfacing therewith outwardly while under it is flat or thereabout to take on a flat or similar surfacing on the outer face of the felly and to fill in between said felly and the tire ends. On each tapered extension is a stud surfacing with the outer face of the tire. The stud 21 on the extension 19 is adapted to have the slot 15 hook over it and to be cottered thereby and by the filling or cotter-head 23 to the tire end 13. The stud 22 on the extension 20 is adapted to have the slot 16 hook over it and to be cottered thereby and by the filling or cotter-head 24 to the tire end 14. The cotter-heads 23 and 24 have the respective pins or shanks 25 and 26 which pass through the extensions 19 and 20 respectively and through the felly 27 and have nuts thereon and so without being subjected to shearing strain hold the ends-closure together.

In Figs. 1 to 9 the central filling piece 18 and the tire ends 13 and 14 have inclined faces as shown. The stud 21 has an inclined or dovetail outer end so that the cotter-head 23 will lock the tire end 13 to the scarf piece 18 or rather to the extension 19 while the key 22 has the inclined or dovetailed face on its inner end so that the cotter-head 24 will lock the tire end 14 to said scarf piece 18 or rather to the extension 20. In this construction the cotter-heads 23 and 24 aid their respective holding shanks on opposite ends of the respective studs 21 and 22.

Figure 12:
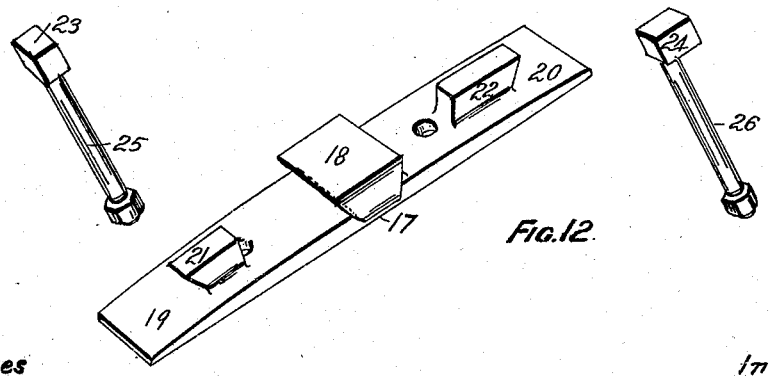

In the modified construction shown in Figs. 10, 11 and 12 the central filling piece 18 has inclined or dovetail ends and the outer ends of the respective studs 21 and 22 are also inclined or dovetailed and in this case the cotter-heads 23 and 24 are both inwardly (or nearer the tire ends) of the respective studs which insure a very perfect hold of the tire to the scarf piece 18 and to the felly.

Figure 8:
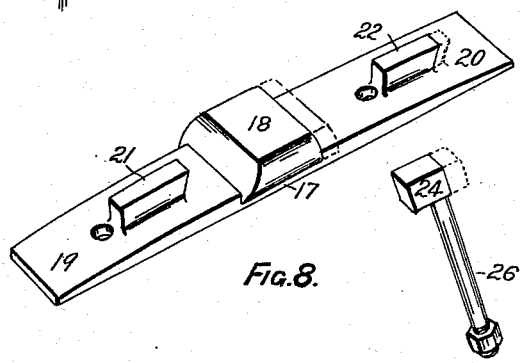

To tighten the tire having the ends-closures described upon the wheels it is ordinarily only necessary to pack between the felly and tire by loosening the nuts on the shanks of the cotter-heads and withdrawing these heads and when sufficiently packed replacing the same. But further provision for such tightening is provided by making the cotter-head 24 on but one side (or end relative to the tire) of the shank so that by using a scarf 17 with a shorter central filling piece 18 as shown in Figs. 7, 8 and 9 this cotter pin may be reversed longitudinally relatively to the tire and be replaced with its shank through the same holes and will close the tire ends together as before described.

Having now fully described and ascertained my said invention and the manner in which it is to be performed I declare that what I claim is;—

1. In a metallic tire, the combination with a felly, of a scarf piece mounted therein provided with projecting studs, a tire having slots longer than the studs adapted to take over the latter and filling members interposed between the ends of the slots and studs.

2. In a metallic tire, the combination with a felly; of a scarf piece mounted therein provided with projecting studs having beveled ends, a tire having longitudinal slots provided with beveled wall at one end and adapted to take over said studs, and filling members interposed between the ends of the slots and studs.

3. In a metallic tire, the combination with a felly; of a scarf piece mounted therein provided with a central projection and a stud on each side of the latter, a tire having slots adapted to take over said studs, and a filling member adapted to be interposed between one end of each slot and the stud.

4. In a metallic tire, the combination with a felly; of a scarf piece mounted therein having a central projection provided with beveled sides and a stud on each side of said projection beveled on one end, a tire having beveled ends conforming to the sides of the central projection and provided with slots adapted to take over said studs, one wall of each slot conforming to the beveled end of each stud, and filling members adapted to be interposed between one end of the slots and studs and having shanks passing through the scarf piece and felly.

In testimony whereof I have signed my name to this specification in the presence of two subscribing witnesses.

GEORGE EDWARD FORTESCUE.

Witnesses:
PERCY NEWELL,
N. J. CANDRICK.